United States Patent
Martin et al.

(10) Patent No.: US 8,027,332 B1
(45) Date of Patent: Sep. 27, 2011

(54) VIRTUAL TELEPHONE EXTENSION

(75) Inventors: Bryan R. Martin, Sunnyvale, CA (US);
Huw Rees, Sunnyvale, CA (US); Tony Chan, Santa Clara, CA (US)

(73) Assignee: 8×8, Inc., Sunnyvale, CA (US)

( * ) Notice: Subject to any disclaimer, the term of this patent is extended or adjusted under 35 U.S.C. 154(b) by 96 days.

(21) Appl. No.: 12/123,594

(22) Filed: May 20, 2008
(Under 37 CFR 1.47)

Related U.S. Application Data

(63) Continuation-in-part of application No. 11/741,379, filed on Apr. 27, 2007, now Pat. No. 7,684,554, which is a continuation of application No. 10/326,572, filed on Dec. 20, 2002, now Pat. No. 7,218,721.

(60) Provisional application No. 60/345,258, filed on Jan. 2, 2002.

(51) Int. Cl.
*H04L 12/66* (2006.01)
(52) U.S. Cl. ........................................ 370/352; 379/220
(58) Field of Classification Search .................. 370/352; 455/428; 379/211
See application file for complete search history.

(56) References Cited

U.S. PATENT DOCUMENTS

| | | | |
|---|---|---|---|
| 5,946,618 A * | 8/1999 | Agre et al. | 455/428 |
| 5,978,450 A * | 11/1999 | McAllister et al. | 379/88.02 |
| 6,707,811 B2 * | 3/2004 | Greenberg et al. | 370/352 |
| 7,383,535 B1 * | 6/2008 | Kshetrapal et al. | 717/122 |
| 7,555,110 B2 * | 6/2009 | Dolan et al. | 379/211.02 |

* cited by examiner

Primary Examiner — Thong Vu
(74) Attorney, Agent, or Firm — Crawford Maunu PLLC

(57) ABSTRACT

Call routing to user communication devices is facilitated. According to an example embodiment, a call-routing switch arrangement uses data in a programmable database to associate or match incoming calls with destination user-communication devices for users employing two or more user identifiers. The incoming calls are then routed to the destination user-communication devices in response to the match. In some applications, the user identifiers include local and virtual telephone numbers for a particular user, the local number pertaining to a geographical location relating to the user's communication device or to a service via which the user's communication device is connected (e.g., a mobile telephone service), and the virtual telephone number to a different geographical location. In this context, a virtual number allows telephone calls to be made to a particular user to give the impression to a caller that the user is located or has offices in a particular geographical location pertaining to an area code in the virtual number.

20 Claims, 2 Drawing Sheets

VIRTUAL TELEPHONE EXTENSION

RELATED PATENT DOCUMENTS

This patent document is a continuation-in-part under 35 U.S.C. §120 of U.S. patent application Ser. No. 11/741,379 filed on Apr. 27, 2007 (U.S. Pat. No. 7,684,554); U.S. patent application Ser. No. 11/741,379 is a continuation under 35 U.S.C. §120 of U.S. patent application Ser. No. 10/326,572 filed on Dec. 20, 2002 (U.S. Pat. No. 7,218,721); U.S. patent application Ser. No. 10/326,572 claims the benefit under 35 U.S.C. §119 of U.S. Provisional Patent Application Ser. No. 60/345,258 filed Jan. 2, 2002; this patent document claims the benefit of each of the above-referenced patent applications, each of which is incorporated herein by reference.

FIELD OF THE INVENTION

The present invention generally relates to communication systems and, more particularly, to a method for routing communications optionally using a broadband telephony system having distributed gateways.

BACKGROUND OF THE INVENTION

The communications industry continues to rely upon advances in technology to realize higher-functioning systems at cost-effective prices. Telephony signals can now be transmitted by methods and systems including traditional publicly-switched telephone networks (PSTN), Internet telephony service providers (ITSP), packet-based systems, digital wireless systems, analog wireless systems, private branch exchanges (PBX), cable systems, Ti systems, integrated service digital networks (ISDN), and digital subscriber line (DSL) systems, to name a few. Widespread acceptance and usage of communication systems and services are largely a function of cost and user convenience.

ITSPs, and increasingly private companies, are deploying Voice-over-Internet protocol (VoIP) technologies through a broadband data network for their private branch exchange (PBX) and communications needs. "Hop-off" gateways bridge local PSTNs and the broadband data network, for example, the Internet. User's calls are routed from a local telephone system, through a local gateway in order to jump from one side of the broadband data network to another where a remote gateway bridges the call to a remote telephone system. Typically, VoIP services are "invisible" to users, operating as any conventional long-distance carrier and exploiting the "free" long-distance transmission of data once on the broadband data network.

The scalability of a communications system weighs heavily upon the acceptance of the system. As the face of today's mobile society and workplace is changing, the ability to provide flexible communications services is becoming increasingly important. Many people are highly mobile on a daily basis, traveling for business, working from several locations, such as base office, branch office, home and field locations. A variety of tools and methods are conventionally used to coordinate telephone communications. Continuously updating a secretary or voice mail greeting with a user's current whereabouts and a nearby telephone number is typical. Callers trying to reach the user at the user's published telephone number are provided the user's updated location information and required to make a second call to track down the party they are attempting to reach. Alternately, pagers alert a user that a caller is attempting to reach the user, providing a contact telephone number for the user to initiate a return call in order to establish a connection. Cellular telephones provide mobile telephone service that follows a user, but pager and cell phone services are expensive and rely on sufficiently-charged batteries to power the mobile equipment. Mobile area coverage is uncertain and call quality is typically lower than for hard-wired communication systems.

To accommodate ongoing communications needs, a user-friendly and user-reconfigurable system would be advantageous. Accordingly, there is a need for a flexible and cost-effective approach for providing seamless telephony services to a plurality of user-reconfigurable destinations, including fixed and mobile user interfaces. Such an approach should take into consideration end-users' expectations of accessing any other telephone in the world using existing telephone equipment, user interfaces and user calling paradigms. A broadband data network telephony system and method that address the aforementioned problems, as well as other related problems, are therefore desirable.

SUMMARY OF THE INVENTION

The present invention is directed to a communication routing system utilizing a broadband data network. The present invention is exemplified in a number of implementations and applications, some of which are summarized below.

According to an example embodiment of the present invention, a communication routing system routes calls from a remote communications network to a plurality of user-communication devices over a packet-based network. The system includes a user-programmable database and a call-routing switch arrangement that uses information in the database to route calls. The user-programmable database stores association data that can be implemented by a computer to associate, for each user, at least two independent user identifiers with at least one device identifier that identifies one of the user-communication devices. The call-routing switch arrangement routes each call received from a remote communications network to a destination user-communication device over a packet-based network in response to user identifier data in the call and association data in the user-programmable database.

In connection with another example embodiment, calls are routed from a remote communications network to a plurality of user-communication devices over a packet-based network. Association data is stored for implementation by a computer to associate, for each user, at least two independent user identifiers with at least one device identifier that identifies one of the user-communication devices. Each call received from a remote communications network is routed to a destination user-communication device on a packet-based network in response to user identifier data in the call and the stored association data.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
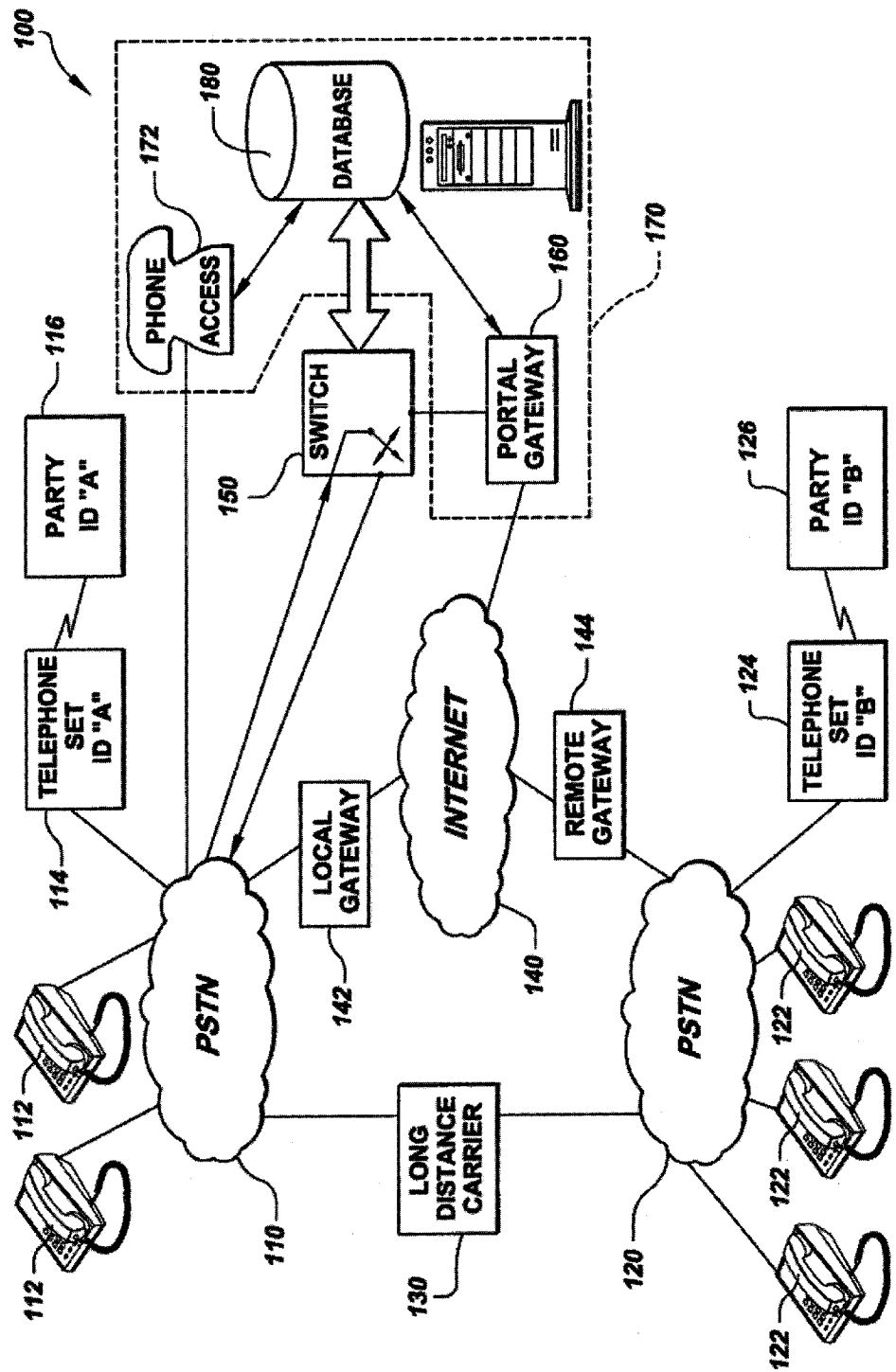
FIG. 1 is a communication routing system, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to various types of communication systems, including telephony systems, and has been found particularly suited to broadband data network telephony systems, including systems which route the communications via an Internet protocol (IP) network. While the present invention is not necessarily limited to such telephony systems, various aspects of the invention may be appreciated through a discussion of various examples using this context.

Conventionally, a telephony system caller desiring to call "someone" actually designates to the telephony system, by dialing a telephone number, an identifier for a telephony system circuit or channel. Typically, one or more communication devices are hard-wired to the telephony system or channel. Where more than one communication device is connected to a particular circuit, the communication devices operate together in parallel. Conventionally, communication equipment, rather than people, are identified when placing a call. Association between a person and a communication device is accomplished via published correlation lists, for example telephone books or web-based lists. A caller must learn of the association between the person the caller wishes to call and the appropriate communication device, subsequently designating the associated communication device identifier to a communication network call-routing switch.

The communications routing system of the present invention is adapted to receive, route, process, and deliver communications data, particularly telephony communications signals, using a cost-effective, user-friendly operations platform. The system includes a call-routing switch, a user-programmable database and a plurality of communication devices communicatively coupled to one or more communication channels comprising a communication network. Each user programs the database with an association between that user's identifier and a communication device at which the user wishes to receive calls. A caller then designates a user identifier rather than a communication device identifier, to a communication call-routing switch and the switch routes the call to the communication device the called party has pre-associated in a database with the called party's user identifier and at which the called party wishes to receive calls. The user identifier serves as a virtual extension number assigned to an individual person, entity, business or organization. User identifiers may still identify geographic locations where appropriate, for example, by always associating a user identifier for a geographic location to a communication device identifier at that geographic location.

Users are free to re-program the database association for their user identifier to other communication devices as the user's location changes. For example, when a user moves during the day from office to car to home, the user is able to remotely update the database and associate their user identifier to a communication device near the user's present physical location e.g., first a work telephone, then a car phone, and finally to a communication device located at home. A caller attempting to call the mobile user simply designates the person's user identifier with whom the caller wishes to speak, and the call is routed to a communication device according to a present state of the call-routing database which reflects the user's present location.

Communication network channels are purchased or leased to serve geographic locations, in much the same way that telephone systems operate now. A user pays to have a telephone line serve the user's home, Home A, for example. A telephone book listing publicizes the association between the user and the particular device identifier (telephone number) serving the user's home, Home A. Conventionally, when a user moves from Home A to a new home, Home B, several transactions occur. First, the user stops paying to have a telephone line serve Home A and starts paying to have a telephone line serve Home B. A new party may pay to have a telephone line serve Home A. Publications of the old association between the user and Home A are inaccurate until updated, callers typically receiving an audio message and re-directing their calls manually to Home B's communication device identifier.

Using the method of the present invention in a situation where a user moves permanently from Home A to Home B, the user's identifier by which the user is called remains unchanged. Publications associating a user with a user identifier remain accurate. The user still stops paying to have a telephone line serve Home A and starts paying to have a telephone line serve Home B. A new party may pay to have a telephone line serve Home A. The user simply updates the database associating their user identifier with a device identifier serving Home B. Subsequent calls to the user (i.e., their user identifier) are properly routed according to the updated database to Home B, thus "finding" the user in their new home location.

Communication network channels with "attached" communication devices include other conventional forms of communication arrangements in addition to a hard-wired, land line having an attached typical telephone set, as in the example above. Communication devices compatible with the present invention include cellular telephones, digital phones, video phones, voice over Internet protocol (VoIP) phones, facsimile machines, and other addressable communication channels and receiver implementations.

The call-routing process is invisible to callers. Furthermore, the method of the present invention does not disclose the called party's geographic location to a caller. Business calls to a user reach the called party at their work location, at their home, at the golf course, or even on a long-distance vacation, the actual destination location being invisible to the caller. One aspect of the present invention includes a person having a plurality of user identifiers. For example, a person has one work user identifier and one personal user identifier, in much the same manner that a person might have a work e-mail address and a personal e-mail address. Just as the person might send and receive work-related correspondence through the work e-mail address, and personal correspondence through the personal e-mail address, in one embodiment of the present invention a user receives work-related communications through the work user identifier and receives personal-related communications through the personal user identifier. During working hours, the user can choose to direct calls for the personal user identifier to a voice mail communication device, and further directs calls for the business user identifier to the communication device located in the office where they are working. Alternatively, a user can choose to direct calls for both the business user identifier and the personal user identifier to the communication device located in the office where they are working. One aspect of the present invention is the ability to control the ring pattern of a communication device to indicate the user identifier for which a received call is directed, thus allowing the user to use an appropriate greeting when answering the call. Associations between the two user identifiers can be individually re-directed at the conclusion of working hours, for example.

Another aspect of the present invention is that a user identifier is authenticated by the call-routing switch prior to completing the call whenever a plurality of user identifiers are associated with a singular communication device identifier. In one example embodiment of the present invention, a call to one of a plurality of user identifiers associated with a particular communication device causes the device to indicate the call (e.g., ring the telephone). When answered, a greeting announces that the call is directed for a particular user associated with the user identifier to which the call was placed. An example announcement is, "This is a call for Robert Smith, please enter your password." Alternatively, a display similar to conventional caller ID displays, indicates not only the calling party but also the called party.

An authentication is subsequently solicited before the call is completed, for example, by requesting an authenticating password. The authentication process is similar in part to conventional collect telephone calls. If the correct user has answered the telephone, they can provide the required password and receive the call. If the correct user does not answer the telephone, they can notify the user to which the call is directed, who then authenticates the call. If the called user is not present, or the user does not wish to receive the call, the call can be re-routed to an alternative communication device associated with the user identifier called, such as a voice mail communication device to record a message. The alternative communication device can also be another telephone set. More than one back-up, or alternative, communication device can be associated with a user identifier so that calls progress through a series of device identifiers at which the called party might be located. For example, a call progression might start with a telephone located at work, then no-authentication transfer to a car phone, then no-authentication transfer to a home phone, and finally no-authentication transfer to a voice mail communication device.

In another aspect of the present invention, a call to a user identifier is broadcast to a plurality of associated communication devices simultaneously, the call being completed to the communication device from which a user authentication is accomplished.

In yet another aspect of the present invention, communication devices authenticate a user identifier prior to permitting a call to be made from that communication device. Billing accounting according to user identifiers is possible, as is communication device control. For example, a parent is able to meter or limit the total time a teenager may use the telephone in a given period, and may further restrict use of the communication network to certain hours of the day.

A global emergency user identifier would enable calls to authorities, and in a further example embodiment, not only permits usage of the communication network, but also places and routes the call. For example, dialing 911 would permit usage of a communication device, place a call to authorities as is conventional, inform the authorities of the geographic location of the communication device, and optionally, provide information regarding any users presently associated with the communication device.

In one example embodiment, a user logs-in to a communication device prior to using the communication device to place a call. A caller ID system indicates the name of the particular user to called parties, rather than a label associated with a communication device identifier from which the call was placed, as is now conventional. For example, a conventional caller ID display of a calling party typically indicates the name of the party paying for the communication device and the communication device identifier, "John Smith 123-4567" regardless of who is actually placing a call from that communication device. The method of the present invention enables a caller ID to display a name associated with the user identifier logged-in as making the call, "Mary Smith 987-6543" for example, where 987-6543 is Mary Smith's user identifier, rather than the device identifier from which the call was made. In this way, if the call is not completed, but recorded in a caller ID log, the called party can reach Mary Smith by calling her user identifier even if Mary Smith is no longer associated with the particular communication device from which she initially called.

In a further embodiment, a caller ID log includes not only calling party information, but also the called party information so that the correct party can return Mary Smith's call. In a still further example embodiment, caller ID logs are kept centrally according to user identifiers, a user retrieving their own log information that includes calling party, calling party user identifier and optionally, communication device identifier to which the calling party's call was routed (to which the called party's user identifier was associated at the time of the call).

In another aspect of the present invention, the user-programmable database is remotely programmable. A user reaches the database through a portal communication device having a portal device identifier. The portal communication device is contacted through the communication network, the portal identifier being similar to a communication device identifier. The database and portal communication device are arranged and configured to allow the user to program the database through a communication network communication device. For example, a user calls an access telephone number and is directed through a conventionally-configured telephone menu, selecting and entering database programming choices through the user's communication device. In another example, the user accesses the database through a data network, such as through an Internet web page on a server. The data network couples the user's computer terminal to the database web page server, and information is exchanged over the data network.

Optionally, call-routing databases are geographically dispersed, for example being implemented at a business having a plurality of employees. One portal communication device is used to access the database and/or a local call-routing switch. In a further aspect, the portal communications device prompts callers from a user directory, and is adapted to elicit a destination user identifier determined from a pre-defined directory, and designate the destination user identifier prior to passing a call through to the call-routing switch.

In another example embodiment of the present invention, a user logs-in through a communication device to establish an association between a user identifier and a communication device identifier. For example, a user calls from a telephone to access the call-routing database and enters a user identifier, and optionally a password. Logging in to a user account is similar to a UNIX® login using a user identifier plus passcode. A user's profile is automatically downloaded to a PBX after login, and associated with the communication device used to contact the database. A user's profile includes information associated with a user identifier, such as the user's name, address, billing information, back-up call routing, voice mail communication device identifier, e-mail account address, greetings, caller ID display data and communication device ring pattern. In a further example embodiment, a plurality of users login from the same communication device resulting in a plurality of user identifiers being associated with one communication device. The plurality of users share the communication device, and an announcement and authentication process, as previously described, is used to differentiate between users for each call routed to the common communication device.

Logging-in optionally triggers other customized communication system features. A user is optionally notified of voice mail message quantity and status in the user's voice mail box, notified of calendar functions and communication device status. For example, after logging in a user receives an audio message, "You have 2 new messages, 3 saved messages, a meeting in 10 minutes, you are the only user associated with this communication device which is on 'do not disturb' mode."

Another aspect of the present invention is that the call-routing switch arrangement is further adapted to optionally route non-local calls for delivery to the destination communication device through a broadband data network portion of the communication network. Users are optionally able to select a long-distance carrier for routing non-local calls. Non-local calls are calls made which are outside a local PSTN, or otherwise involve a toll charge to complete the call. In a further aspect, because the method of call-routing is transparent to a calling party, a signal to the calling party is used to indicate that the re-routed call requires access to a long-distance carrier to reach the intended called party.

FIG. 1 illustrates one example embodiment of a communication routing system 100 of the present invention. A local PSTN 110 is coupled to a remote PSTN 120 through a long distance carrier 130. Furthermore, local PSTN 110 is coupled though a local gateway 142 to a broadband data network 140, the Internet for example. Remote PSTN 120 is coupled to broadband data network 140 via a remote gateway 144. A plurality of communication devices 112 are communicatively coupled to local PSTN 110. Additionally, communication device 114 having device identifier "A" is also coupled to PSTN 110. A plurality of communication devices 122 are communicatively coupled to remote PSTN 120. Communication device 124 having device identifier "B" is also coupled to PSTN 120. A first user 116, having user identifier "A" is associated with communication device identifier "A," and a second user 126, having user identifier "B" is associated with communication device identifier A plurality of PSTNs and the broadband data network, along with other coupled communication channels and devices form a communication network. The communication network of the present invention is optional as described in related U.S. patent application Ser. No. 09/966,713 (U.S. Pat. No. 7,394,803), entitled "Distributed Local Telephony Gateway," filed on Sep. 28, 2001, the systems and methods described therein fully incorporated herein by reference.

Call-routing switch 150 is coupled to local PSTN 110 in a manner by which calls received through switch 150 may be routed back to PSTN 110. In a further example embodiment, a call-routing switch is coupled to a PSTN with sufficient capacity to permit processing a plurality of communication paths simultaneously. Switch 150 is further coupled to broadband data network 140 through a portal gateway 160, gateway 160 functioning as a bridge between data network and non-data network portions of the communications network.

A portal gateway is implemented within a computer server platform 170 in the example embodiment of the present invention shown in FIG. 1. Other gateway implementations of a gateway functional block are contemplated within the scope of the present invention, a stand-alone interface for example. Server 170 is further communicatively coupled to local PSTN 110 through a portal communication device 172, a telephone interface device for example. Additionally, server 170 includes a user-programmable relational database 180 storing user information and association information, between user identifiers and device identifiers, between user information and user identifiers, between user identifiers and voice mail identifiers, and between user identifiers and e-mail addresses for example. Billing, operational, digital voice mail messaging, e-mail and other information are also optionally stored in database 180. Database 180 is alternatively implemented in a distributed manner, through a plurality of interconnected separate and geographically dispersed databases. Database information is parsed by information type and/or by geographic location of users as a particular application of the present invention requires.

Database 180 is communicatively coupled to call-routing switch 150. Call-specific, as well as associative information used to appropriately direct calls as described herein, are provided between switch 150 and database 180. Users have access to user-programmable features of database 180 through a PSTN network via portal communication device 172, or through the broadband data network 140 via portal gateway 160.

User "A" places a call to User "B" by entering User "B's" user identifier through communication device "A." Optionally, User "B's" user identifier includes a prefix portion that routes the call through the local PSTN to switch 150. Switch 150 re-directs User "A's" call to User "B" responsive to association data in database 180, User "B" being presently associated with communication device "B" 124. Communication device "B" is coupled to a remote PSTN, and is thus a non-local call. Switch 150 routes the call through portal gateway 160, broadband data network 140, remote gateway 144, remote PSTN 120 to communication device 124. User "B" receives the call through communication device 124.

Figure 2:
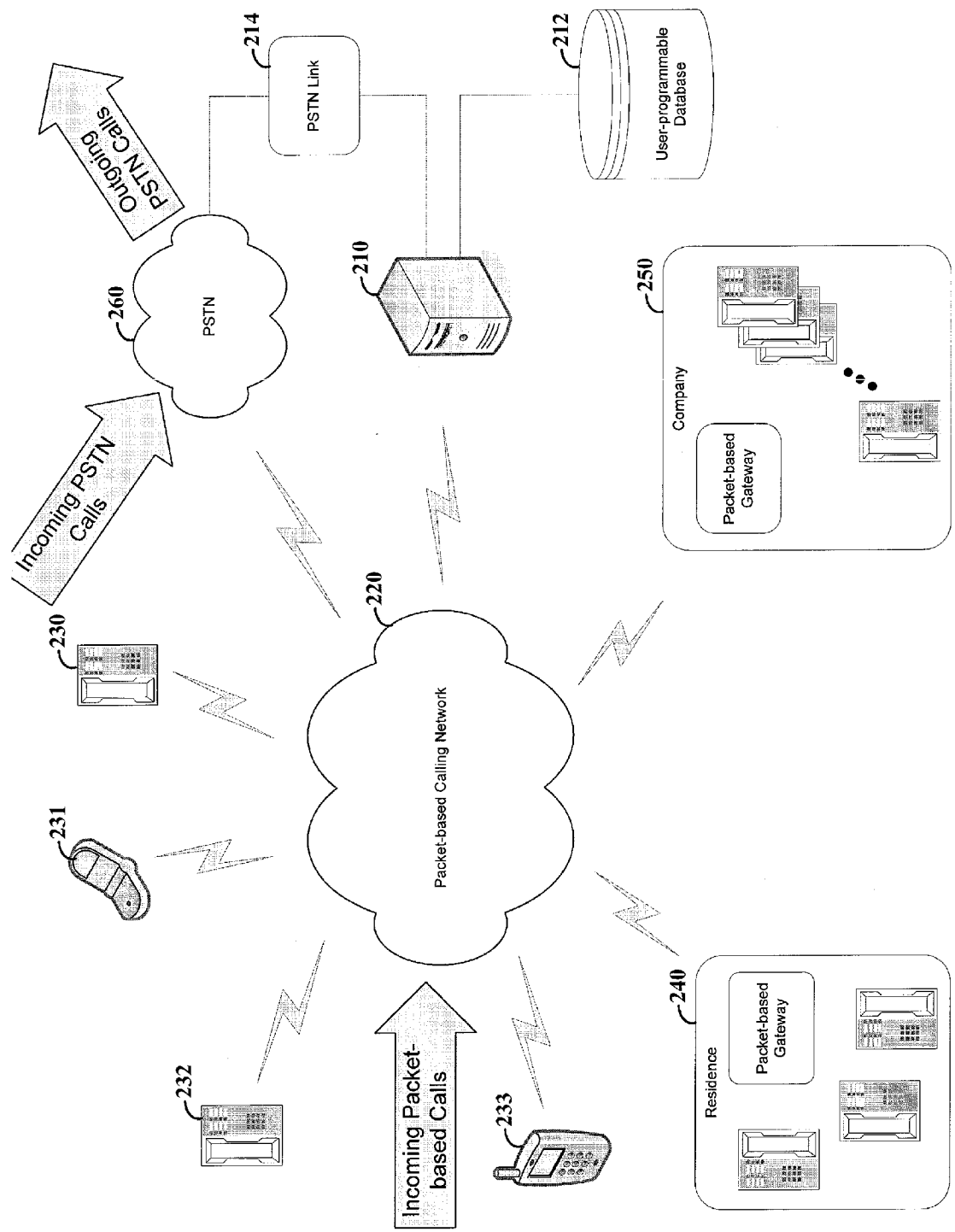
FIG. 2 is a packet-based calling system, according to another example embodiment of the present invention.

FIG. 2 shows a packet-based calling system for routing calls from a remote communications network to a plurality of user-communication devices over a packet-based calling network 220, according to another example embodiment of the present invention. The system includes a call-routing switch arrangement 210 to route calls received via a PSTN 260 and/or the packet-based calling network 220 (e.g., the Internet), and a user-programmable database 212 that stores data used by the call-routing switch arrangement to route the received calls. The system is amenable to routing calls originated from a variety of sources, such as PSTN-based telephones that connect to a local PSTN, from mobile phones that connect to one or both of a PSTN or packet-based calling network via a wireless communication network, and packet-based calling devices such as computers or telephones connected to the Internet.

The user-programmable database 212 stores association data that can be implemented by a computer to associate, for each user, at least two independent user identifiers with at least one device identifier that identifies one of the user-communication devices. For instance, a particular user may employ two different user identifiers that are telephone numbers having a common or different area code. In these contexts, independent identifiers are identifiers that may be independently used to call a user, such as two unrelated telephone numbers.

In some applications, one of the telephone numbers is a "virtual" number in that the user resides in a geographical location pertaining to a particular area code or set of area codes, yet employs a virtual number that pertains to a completely different geographical location. Such an application may involve a user or business located in the San Francisco, Calif. area that employs a "virtual" telephone number having an area code associated with the New York, N.Y. area such that callers dialing the New York area code are given the impression that the called location is a New York location. In such applications, the user may assign both a location-based telephone number and virtual telephone number to a particular telephone device, with the location-based telephone number corresponding to a local area code prefix for the location at which the user's telephone either physically resides or at which the telephone's service is based (e.g., for a mobile phone). The call-routing switch arrangement 210 thus receives and routes telephone calls to the user's telephone device designated by a device identifier, using the association data in the user-programmable database, in response to the telephone call specifying either the user's location-based telephone number or the user's virtual telephone number.

The location of the user-programmable database 212 can be local to or remote from the call-routing switch arrangement 210, with appropriate communications between the two in order to facilitate call routing functions. For many applications, the user-programmable database 212 employs different databases in different locations, each accessible by one or more devices that make up the call-routing switch arrangement 210. These locations may, for example, pertain to area code locations relating to locations of users to which calls are routed, or to area code locations for telephone numbers (or virtual numbers) to which user identifiers apply.

The call-routing switch arrangement 210 routes each call received from a remote communications network, such as a PSTN 260 or a packet-based calling network 220, to a destination user-communication device on the packet-based calling network 220 using user identifier data in the call and association data in the user-programmable database 212. For instance, where an incoming call is received via the PSTN 260, a PSTN link 214 may be employed to interface the call-routing switch arrangement 210 with the PSTN for receiving and processing the call. The call-routing switch arrangement 210 uses a telephone number in each received call and association data in the user-programmable database to match the calls with a particular device identifier and, based upon the device identifier, to route the calls to a particular telephone device. In these contexts, the device identifier may include or otherwise indicate, for example, a packet-based telephone address, a mobile telephone number or a PSTN-based telephone number.

The call-routing switch arrangement 210 includes one or more processing and routing devices in one or more locations. For some embodiments, the call-routing switch arrangement 210 includes a computer device or arrangement that operates a call switching platform (i.e., software-implemented) to switch received calls to a destination user-communication device, using association data in the user-programmable database 212. The computer device or arrangement can be located in a single environment or across different environments and communicates across a network to implement call-routing functions.

The call-routing switch arrangement 210 routes calls to and from a variety of communication devices using association data as described above. By way of example, FIG. 2 shows several devices to which calls can be routed and/or from which calls can be received and routed accordingly. Further, these devices may be coupled directly to a packet-based network, or indirectly via some sort of interface. In this context, packet-based telephone devices 230-233 are shown coupled to the packet-based calling network 220, and other telephone devices are shown coupled to the packet-based calling network 220 via gateways, respectively for a residence 240 and company 250 with the gateway routing calls to telephones that may or may not be packet-based. Each device, or a gateway for a device or set of devices, is assigned a device identifier at the user-programmable database 212 for use in routing calls to the (destination) devices.

Outgoing calls to a telephone coupled to a PSTN network 260 can be routed via the packet-based calling network 220 and/or a PSTN link 214. Incoming calls can also be received from devices 230-233 and those shown at 240 and 250, or otherwise received over the packet-based calling network 220 (shown by way of an incoming arrow) or from a PSTN 260 (shown by way of an incoming arrow) and either the PSTN link 214 or the packet-based calling network 220.

In a manner similar to that used above in matching incoming calls to a particular device identifier, the call-routing switch arrangement 210 also selectively assigns an outgoing identification to calls made from user communications devices. For instance, where a particular user employs a virtual telephone number for a particular geographical location, that user may wish that telephone number to appear in caller ID data when the user is making outbound calls from a different geographical location. The call-routing switch arrangement uses information in the user-programmable database to determine which (if any) telephone number to provide for caller ID information in outgoing calls. Using the above example and this approach, a user making a telephone call from San Francisco can set preferences in the user-programmable database 212 that specify that calls made from San Francisco be assigned a caller ID that relates to the user's virtual New York-based telephone number. User preferences for such virtual caller ID assignment may specify, for example, caller ID data to use depending upon the geographical location of an area code being called. Such an approach may be implemented, for example, by designating all calls made to east coast locations to identify the virtual New York-based caller ID, and calls made to west coast locations to identify the San Francisco-based caller ID.

One or both of the user identifiers assigned to each user may be assigned to one or more telephone devices located on one or more calling networks, based upon user-programmed configurations in the user-programmable database 212. For instance, a user may assign two telephone numbers to a particular telephone device or location (e.g., one of devices 230-233 or residence 240); to support this assignment, the user-programmable database 212 stores association data that associates both telephone numbers with a device identification for the particular telephone device. As another example, a business may assign different telephone numbers to different telephone devices at one or more business locations (e.g., company 250). With these approaches, the user-programmable database 212 is implemented to flexibly control and implement the selective routing of calls from one or more of a multitude of telephone numbers to one or more of a multitude of telephone devices.

In some embodiments, the user-programmable database 212 stores a multitude of telephone numbers having disparate area codes for selective association with user-communication devices. For example, a telephone service company implementing the user-programmable database 212 may obtain rights to use and assign a multitude of telephone numbers in one or more area codes. The user-programmable database 212 is correspondingly responsive to user inputs by selectively storing association data that associates one of the multitude of telephone numbers with a device identifier for a particular user's telephone user-communication device. Such an assignment may be effected or authorized by a telephone service company in conjunction with user selections.

In connection with other embodiments, the call-routing switch arrangement 210 facilitates the assessment of fees in accordance with a particular user identifier implemented for either outgoing or incoming calls. For example, where telephone calls are routed between geographic locations having respective area codes to which long-distance fees may apply, the call-routing switch arrangement 210 facilitates the assessment of the fees in a manner that may be independent of the user identifier (e.g., a dialed telephone number) used in making the call. Using the above San Francisco and New York example, a user in San Francisco employing a virtual number having a New York-based area code may receive a call from a New York-based caller dialing a local number (the virtual number), yet the call is routed to a destination communication device in San Francisco. In such a situation and for certain embodiments, the call-routing switch arrangement 210 assesses long-distance fees for the call by, for example, assessing the fee to a user employing the virtual telephone number as the caller is expecting to make a local call that may be free or otherwise subject to a different fee structure.

For general information regarding call routing approaches and arrangements, and for specific information regarding call-routing approaches, devices and arrangements that may be implemented in connection with one or more example embodiments herein, reference may be made to U.S. patent application Ser. No. 09/966,713 (U.S. Pat. No. 7,394,803), entitled "Distributed Local Telephony Gateway" and filed on Sep. 28, 2001, which is fully incorporated herein by reference.

Accordingly, the present invention is not to be necessarily limited to the particular examples described above, but is intended to cover all aspects of the invention as fairly set out in the attached claims. For instance, while telephony systems are illustrated, other communication systems can benefit from the above mentioned teachings. Various modifications, equivalent processes, as well as numerous structures to which the present invention may be applicable will be readily apparent to those of skill in the art to which the present invention is directed upon review of the present specification.

What is claimed is:

1. A communication routing system for routing calls from a remote communications network to a plurality of user-communication devices over a packet-based network, the system comprising:
   a user-programmable computer system database configured to store association data that can be implemented by a computer to associate, for each user, at least two independent user identifiers with at least one device identifier that identifies one of the user-communication devices, the independent user identifiers including, for each user, a location-based telephone number having an area code prefix assigned to the user's telephone user-communication device and a virtual telephone number having a different area code prefix for a geographical region designated by the user, and data associating the telephone numbers with a device identifier for a telephone user-communication device; and
   a call-routing switch arrangement configured to route each call received from a remote communications network to a destination user-communication device over a packet-based network in response to user identifier data in the call and association data in the user-programmable database.

2. The system of claim 1, wherein the call-routing switch arrangement is a computer arrangement programmed to operate a call switching platform to switch received calls to a destination user-communication device.

3. The system of claim 1, wherein
   the call-routing switch arrangement receives and routes telephone calls to a particular user's communication device designated by the device identifier, using the association data in the user-programmable database, in response to the telephone call specifying either the user's location-based telephone number or the user's virtual telephone number.

4. The system of claim 1, wherein the user-programmable database stores a multitude of telephone numbers having disparate area codes for selective association with user-communication devices, and is responsive to inputs from a particular user by selectively storing association data that associates one of the multitude of telephone numbers with a device identifier for the particular user's telephone user-communication device.

5. The system of claim 1, wherein the remote communications network includes a PSTN network.

6. The system of claim 1, wherein, for each user,
   the user-programmable database stores caller ID data for outgoing calls, and
   the call-routing switch arrangement selectively assigns caller ID data to each outgoing call made from the user-communication devices in response to at least one of the stored caller ID data and the telephone number for the outgoing call.

7. The system of claim 1, wherein
   the at least two user identifiers for a particular user include two telephone numbers for a user, and
   the call-routing switch arrangement is responsive to a received call designating either of the two telephone numbers by routing the received call to the communication device having a device identifier associated with the two telephone numbers.

8. The system of claim 1, wherein, for a particular user,
   the at least two user identifiers include two telephone numbers, at least one of the telephone numbers having an area code prefix that is different than an area code prefix designated to a geographic location at which the user-communication device having a device identifier associated with the two telephone numbers is located, and
   the call-routing switch arrangement is responsive to a received call designating either of the two telephone numbers by routing the received call to the communication device having a device identifier associated with the two telephone numbers.

9. The system of claim 1, wherein, for a particular user,
   the at least two user identifiers include two telephone numbers having different area code prefixes, and
   the call-routing switch arrangement is responsive to a received call designating either of the two telephone numbers by routing the received call to a communication device having a device identifier associated with the two telephone numbers.

10. The system of claim 1, wherein at least one of the user-communications devices is a packet-based device.

11. The system of claim 1, wherein at least one of the user-communications devices is a telephone device coupled to the packet-based network via a packet-based interface device.

12. The system of claim 1, wherein, for at least one particular user having at least two user-communication devices, the user-programmable database stores association data that can be implemented by a computer to associate, for each of the particular user's user-communication devices, at least one of the at least two independent user identifiers with a device identifier, and the call-routing switch arrangement uses the association data to route received calls to one of the particular user's user-communication devices by identifying a device identifier of one of the at least two communication devices associated with a destination user identifier designated in the call.

13. The system of claim 1, wherein the call-routing switch arrangement is coupled to at least one PSTN via a packet-based network for routing calls to a destination user-communication device via the PSTN.

14. The system of claim 1, wherein, for a particular user,
the at least two user identifiers include two telephone numbers associated with a device identifier for a particular user-communication device, at least one of the telephone numbers having an area code prefix that is different than an area code prefix designated to a geographic location at which the particular user-communication device is located, and the call-routing switch arrangement facilitates the assessment of call fees associated with a telephone call made from a telephone device on the remote communications network to the area code designated in the telephone call.

15. A communication routing system for routing calls from a remote communications network to a plurality of user-communication devices over a packet-based network, the system comprising:

means for storing association data that can be implemented by a computer to associate, for each user, at least two independent user identifiers with at least one device identifier that identifies one of the user-communication devices, the independent user identifiers including, for each user, a location-based telephone number having an area code prefix assigned to the user's telephone user-communication device and a virtual telephone number having a different area code prefix for a geographical region designated by the user, and data associating the telephone numbers with a device identifier for a telephone user-communication device; and means for routing each call received from a remote communications network to a destination user-communication device over a packet-based network in response to user identifier data in the call and the stored association data.

16. A communication routing method for routing calls from a remote communications network to a plurality of user-communication devices over a packet-based network, the method comprising:

storing association data that can be implemented by a computer to associate, for each user, at least two independent user identifiers with at least one device identifier that identifies one of the user-communication devices, the independent user identifiers including, for each user, a location-based telephone number having an area code prefix assigned to the user's telephone user-communication device and a virtual telephone number having a different area code prefix for a geographical region designated by the user, and data associating the telephone numbers with a device identifier for a telephone user-communication device; and routing each call received from a remote communications network to a destination user-communication device over a packet-based network in response to user identifier data in the call and the stored association data.

17. The method of claim 16, wherein storing association data includes assigning at least two unique user identifiers and at least one unique device identifier to each of a plurality of users.

18. The method of claim 16, wherein routing each call includes
matching a user identifier in the call with a device identifier using the stored association data, and
switching the call to a destination communication device designated by the matched device identifier.

19. The method of claim 16,
wherein
routing each call includes routing telephone calls to a particular user's communication device designated by the device identifier, using the association data, in response to the telephone call specifying either the user's location-based telephone number or the user's virtual telephone number.

20. The method of claim 16, wherein
storing association data includes storing, for a particular user, at least two user identifiers that are telephone numbers, at least one of the telephone numbers having an area code prefix that is different than an area code prefix designated to a geographic location at which the user-communication device having a device identifier associated with the two telephone numbers is located, and routing each call includes, in response to a received call designating either of the two telephone numbers, routing the received call to a communication device having a device identifier associated with the two telephone numbers.

* * * * *